United States Patent
Gaines et al.

(10) Patent No.: US 9,744,576 B2
(45) Date of Patent: Aug. 29, 2017

(54) LOCK RING

(71) Applicant: Barnes Group Inc., Bristol, CT (US)

(72) Inventors: Thomas Gaines, Medina, OH (US);
Marc Pentecost, Valparaiso, IN (US);
Dan Frank, Youngstown, OH (US);
Steve Reilly, Westlake, OH (US)

(73) Assignee: Barnes Group Inc., Bristol, CT (US)

( * ) Notice: Subject to any disclaimer, the term of this patent is extended or adjusted under 35 U.S.C. 154(b) by 144 days.

(21) Appl. No.: 14/306,896

(22) Filed: Jun. 17, 2014

(65) Prior Publication Data
US 2014/0373317 A1    Dec. 25, 2014

Related U.S. Application Data

(60) Provisional application No. 61/836,841, filed on Jun. 19, 2013.

(51) Int. Cl.
*F16B 2/06* (2006.01)
*B21B 31/07* (2006.01)
(Continued)

(52) U.S. Cl.
CPC ............ *B21B 31/07* (2013.01); *F16B 21/186* (2013.01); *F16D 1/116* (2013.01); *Y10T 24/44376* (2015.01); *Y10T 29/49947* (2015.01)

(58) Field of Classification Search
CPC ........ F16B 21/186; F16D 1/116; B21B 31/07; Y10T 24/44376; Y10T 24/44034;
(Continued)

(56) References Cited

U.S. PATENT DOCUMENTS

| 740,664 | A | * | 10/1903 | Kroll | ............... F16L 17/035 |
| | | | | | 285/111 |
| 938,344 | A | * | 10/1909 | Schwerd, Jr. | ............ F16L 33/12 |
| | | | | | 24/271 |

(Continued)

FOREIGN PATENT DOCUMENTS

| DE | 10911650 | | 9/1999 | |
| EP | 0050530 | | 4/1982 | |
| NL | 9400784 | A * | 8/1995 | ............ B63B 27/24 |

OTHER PUBLICATIONS

European Patent Office, Extended European Search Report for corresponding application No. EP14002100.7 dated (Jan. 9, 2015).

*Primary Examiner* — Robert J Sandy
*Assistant Examiner* — Matthew Sullivan
(74) *Attorney, Agent, or Firm* — Fay Sharpe LLP

(57) ABSTRACT

A lock ring that has a first ring half, a second ring half and a latch assembly. The first ring half includes a nest opening on a front portion of the first ring half, a back end portion of the first ring portion hingedly connected to a back end portion of the second ring half. The latch assembly is connected to a front portion of the second ring half. The latch assembly includes a connection arrangement and a spring system. The connection arrangement is designed to be releasably positionable in the nest opening. The spring system is designed to cause the front portions of the first and second ring halves to be drawn toward one another when the connection arrangement is positioned in the nest opening.

41 Claims, 8 Drawing Sheets

(51) Int. Cl.
*F16D 1/116* (2006.01)
*F16B 21/18* (2006.01)

(58) Field of Classification Search
CPC ......... Y10T 24/44043; Y10T 24/44051; Y10T 24/4406; Y10T 24/4453; Y10T 24/1441; Y10T 24/44239; Y10T 24/1453; Y10T 24/1486; F16L 23/10; F16L 33/04
See application file for complete search history.

(56) References Cited

U.S. PATENT DOCUMENTS

| | | | | |
|---|---|---|---|---|
| 2,546,098 | A * | 3/1951 | Houghton | F16L 33/12 24/271 |
| 2,677,164 | A * | 5/1954 | Stade | F16L 33/04 24/279 |
| 3,733,108 | A | 5/1973 | Petros et al. | |
| 4,573,717 | A * | 3/1986 | Peacock | F16B 2/185 24/270 |
| 5,950,252 | A * | 9/1999 | Fettes | E04H 4/084 4/498 |
| 7,290,805 | B2 * | 11/2007 | Wu | F16L 23/06 285/364 |
| 7,399,007 | B2 * | 7/2008 | Wu | F16L 23/06 24/23 B |
| 7,828,340 | B2 * | 11/2010 | Heelan, Jr. | F16L 21/065 285/366 |
| 2005/0005663 | A1 | 1/2005 | Gethings | |
| 2009/0217497 | A1 * | 9/2009 | Lans | A47G 29/083 24/499 |

* cited by examiner

LOCK RING

The present invention claims priority on U.S. Provisional Application Ser. No. 61/836,841 filed Jun. 19, 2013, which is incorporated herein by reference.

The present invention is directed to lock rings in general, particularly to lock rings that include a spring biased locking mechanism, more particularly to lock rings that include a fluid spring biased locking mechanism, still more particularly to lock rings that include a gas spring biased locking mechanism, and yet more particularly to lock rings that include a gas spring biased locking mechanism used in retaining a choke assembly used in the processing of metals. The lock rings of the present invention can be used for rolling mill applications.

BACKGROUND OF THE INVENTION

Prior art lock rings are typically made of metal and consist of two ring halves that are connected by a hinge on one end and a latching mechanism on the other end. One such prior art lock ring is illustrated in FIG. 1. The latching mechanism typically consists of a bolt that is connected to one half and pivots over to the other half when in a closed position. Nut(s) and washers are then tightened via hand and/or power tool to achieve the clamping force. This method of closure creates inconsistencies due to the operator, and also yields a geometry that is susceptible to interference issues. The torque of the nut can be different from operator to operator and must be verified to hold any consistency. If the nut is not properly tightened, the lock ring may inadvertently open during use. An example of an interference issue can be from lifting cables getting caught on the lock ring when moving the roll assembly.

In view of the problems and limitations with prior art lock rings, there is a demand for a lock ring that overcomes the past problems associated with improper tightening of the lock ring. There is also a demand for a lock ring that can also eliminate or minimize interference issues associated with the use of the lock ring.

SUMMARY OF THE INVENTION

The present invention is directed to lock rings that include a fluid spring biased locking mechanism, and more particularly to lock rings that include a gas spring biased locking mechanism. The lock ring is particularly useful in the retaining a choke assembly used in the processing of metals; however, the lock ring can have other or additional uses. For example, the lock ring of the present invention can be used in the retaining of bearing assemblies on rolls for materials processing; however, this is not required. In such a non-limiting arrangement, the lock ring can be fastened to the roll neck in a machined groove. This groove is intended to secure the lock ring and is typically located at the ends of the roll. Such a position of the groove and the lock ring allows room for the thrust bearing, thrust collar, and lubrication rings and seals that make up the choke assembly. Such a choke assembly allows and controls the rotation of the rolls during operation and is very important to the quality of the material being processed. Depending on the type of mill, this assembly, including the lock ring, can be utilized on all rolls in the stack up. As can be appreciated, the lock ring can have different shape/geometry characteristics so that the lock ring can be used as a substitute for existing prior art lock rings so as to significantly improve the safety and reliability of the locking feature of the lock ring.

In one non-limiting embodiment of the present invention, the lock ring is made of two ring halves. As can be appreciated, the lock ring can be formed of more than two ring portions (e.g., 3 portions, 4 portions, etc.). When the lock ring is formed of two ring halves, the first ring half generally includes a hook-like geometry that is acted upon to close, and the second ring half typically houses the latching assembly. When the lock ring is formed of more than two ring portions, the lock ring includes first and second primary portions and one or more secondary portions which connect or interconnect together the first and second primary portions. The first primary portion generally includes a hook-like geometry that is acted upon to close and lock the lock ring, and the second primary portion typically houses the latching assembly. One end of the first and second ring halves are generally connected together via a hinge pin; however, it can be appreciated that other or alternative connection arrangements can be used. A gap can optionally be present between the first and second ring halves at the location of the hinge to allow for self-alignment; however, this is not required. This self-aligning feature can be used to obtain a snug fit with flat interfaces for mating components, thereby reducing or eliminating the need for adjustments. When the lock ring includes more than two portions, the connected portions can be hingedly connected together via a hinge pin; however, it can be appreciated that other or alternative connection arrangements can be used. A gap arrangement as discussed above can optionally be used. The first and second ring halves or primary ring portions can be smoothly rounded, contoured, etc. so that such rings or ring portions adapt to any envelope constraints so as to reduce or eliminate any feature of the lock ring that could cause interference with existing mates or methods/procedures in the mill or other application.

The closing or locking function of the lock ring of the present invention is brought about by a latch assembly that includes a spring assembly that provides a clamping force. The spring assembly can be formed of one or more mechanical springs and/or fluid springs (e.g., gas spring, liquid spring, gas/liquid spring). In one non-limiting arrangement, the spring is or includes a gas spring. One non-limiting type of gas spring that can be used is a nitrogen gas spring. Inherent to this design of the closing or locking function is an iso-tension feature that allows the ring to flex to accommodate for any variance in roll groove diameter within the stroke of the spring. The spring is designed to provide a generally constant clamping force throughout its stroke. The ring halves or first and second primary ring portions can be separated or brought together without losing this clamping force. The clamping force can also be variable to suit any need within sound engineering practices given the construction of the spring. The tension applied by gas spring may or may not be a constant tension. The ends of the ring are typically designed to not make contact when the lock ring is installed on the roll or other type of device; however, this is not required. The spring assembly is preloaded by tension to provide a clamping force on the roll groove or other type of device. The design, size and shape of the gas spring are non-limiting. The size, shape, design and materials of the lock ring are non-limiting. The lock ring of the present invention is designed to provide an improved clamping force by the lock ring over the life of the installation regardless of wear on the groove and/or ring, and/or thermal growth of the roll or ring. Also, the tension applied by the lock ring is not dependent on torque, thereby increasing reliability of the lock ring. Also, close tolerance manufacturing of the inside diameter of the ring is not necessary for a good fit as the spring arrangement on the lock ring can be designed to provide a relatively constant tension force across a wide range of sizes in the mating components. As previously mentioned, prior art lock rings had several problems. One of the problems is that the lock ring becomes loose and thereby spins the groove (relative to the roll). Causes for the loosening and spinning of the prior art lock rings included:

Tolerance issues with inner diameter of ring or outer diameter of groove.

Bolt not properly torqued/bolt loses preload.

The lock ring of the present invention overcomes this problem with prior art lock rings. The lock ring of the present invention includes a spring tensioner that cannot spin because the tension is constant or relatively constant from the spring. Also, the lock ring can be designed such that the ends of the ring have a gap between them when installed on the groove outer diameter. The use of a spring arrangement to create the locking force in a lock ring is believed to be novel to the art of lock rings. The two ring halves or first and second primary ring portions along with the latching assembly that includes the spring arrangement make up the novel invention.

In another and/or alternative non-limiting aspect of the invention, the first ring half or first ring portion of the hooked half can be either smooth or contoured to adapt to any envelope constraints. The inner diameter or surface of the first ring half or first primary ring portion can optionally be chamfered to allow relief for radii in the roll groove. The hinge end of the first ring half or first primary ring portion can be double/single lap or other some hinge design to adapt to any mill condition and to allow the assembled invention to open for installation. The opposite end or hook end of the first ring half or first primary ring portion includes a hook geometry or nest. The nest is the housing geometry to the connection arrangement (e.g., T-handle, etc.) of the latching assembly. The nest can be of any configuration. In one non-limiting arrangement, the nest includes one or more features selected from the group of an opening, a lead-in angle, exit angle, a safety spring detent, a static home geometry and relief cut. The size and shape of the opening of the nest is non-limiting. The opening can include a lead-in angle to facilitate in the insertion of the connection arrangement into the nest. The opening angle can be about 20-70°, typically about 30-60°, more typically about 40-50°; and even more typically about 43°-48° from vertical and is designed to interact with the connection arrangement (e.g., T-handle) to facilitate in mechanically lifting the connection arrangement into the opening and into the nest, thereby translating forces imposed by the operator. The opening can also include an exit angle that is also designed to interact with the connection arrangement (e.g., T-handle) upon exiting the nest. The exit angle, when used, can be about 20-60°, typically about 30-50°, more typically about 35-45°, and even more typically about 39-41° from horizontal to translate the forces imposed by the operator to mechanically lift the connection arrangement (e.g., T-handle) out of the nest. The lead-in and exit angle, when used, are typically designed to smoothly transition into one another with a radius.

In still another and/or alternative aspect of the invention, the nest can optionally included one or more safety detents. The safety detents are designed to facilitate in retaining the connection arrangement (e.g., T-handle) in the nest. The size and configuration of the one or more safety detents is non-limiting. In one non-limiting embodiment, the one or more safety detents can be spring bias. The spring can be a mechanical and/or fluid spring. In one non-limiting arrangement, the first ring half or first ring primary portion includes two or more safety detents. In one non-limiting configuration of one or more safety detents, the safety detents are spring loaded ball inserts. The spring loaded safety detents can be designed to exert a force of at least about 1 pound, typically about 2-20 pounds, and more typically about 4-11 pounds along its own axis of motion. The axis of motion is generally perpendicular (e.g., 85-95°) to a surface tangent to the static home geometry and 2-20° (e.g., 7-12°) greater than the exit angle from horizontal; however, this is not required. The safety detents can be inserted into two pre-drilled holes along this surface. The one or more safety detents act as a restraint to the connection arrangement (e.g., T-handle) when the connection arrangement is positioned in the nest. As such, in the event that the housing spring in the second ring half or second primary ring portion loses strength or pressure, the one or more safety detents would keep the connection arrangement (e.g., T-handle) in the nest. In one non-limiting arrangement, the static home geometry is the closed home of the connection arrangement (e.g., T-handle) is generally a diameter that is greater than an outside diameter of the connection arrangement (e.g., T-handle) horizontal component. Such diameter is generally at least about 0.02 inches greater than an outside diameter of the connection arrangement horizontal component, and typically about 0.063-0.078 inches greater than an outside diameter of the connection arrangement horizontal component. The static home geometry of the next is the main locating feature of the nest and should be located at the end of the first ring half and first primary ring portion and to allow the connection arrangement (e.g., T-handle) to enter the nest when being installed on the roll neck or other device. The relief cut allows the connection arrangement to enter the nest.

The second ring half or second ring primary portion houses the latch assembly. Similar to the first ring half or first primary ring portion, the second ring half or second primary ring portion can be either smooth or contoured to adapt to any envelope constraints. The inner diameter or surface of the second ring half or second primary ring portion can optionally be chamfered to allow relief for radii in the roll groove. The hinge end of the second ring half or second primary ring portion can be double/single lap or other some hinge design to adapt to any mill condition and to allow the assembled invention to open for installation. The hinge design can be made utilizing a number of designs. The hinged end allows the assembled invention to open enough for installation. The other or opposite end of the second ring half or second primary ring portion includes a hole or cavity that is used to house the latch assembly. This cavity or through hole is generally at an angle such that the latch assembly is wholly contained within the cavity or hole while in an open position relative to the plane where the inner and outer diameters are discernible; however, this is not required. Also, the angle of the cavity or hole is designed to also satisfy the constraint that, when in a closed position, the angle between the connection arrangement (e.g., T-handle) and the yoke are at a certain angle. Generally such angle is such that the angle does not exceed about 2-30° of the two being parallel, typically about 5-25°, more typically about 10-20°, and still more typically about 15°. Radial holes along the outer diameter of the second ring half or second primary ring portion can be used to act as leverage holes to rotate the second ring half or second primary ring portion relative to the roll neck; however, this is not required.

The latch assembly is the mechanism that creates the clamping force that keeps the lock ring in the closed or locked position. The latch assembly includes a connection arrangement (e.g., T-handle), a yoke and a spring system (e.g., gas spring). In one non-limiting arrangement, the connection arrangement is in the form of a T-handle. The T-handle is a T-shaped piece of material (e.g., metal) that, in the closed position, sits in the static home geometry of the nest and transfers the force of the gas spring to the first ring half or first primary ring portion. Both sides of the cross feature of the T-handle can include an angled cut; however, this is not required. The angled cut surface, when used, interacts with the lead-in angle of the nest to facilitate in inserting the T-handle into the nest when locking the lock ring and to facilitate in removing the T-handle from the nest when opening the lock ring. A vertical hole along the center axis of the vertical feature and centered on the cross feature of the T-handle can be used to facilitate in the locking and the unlocking of the lock ring. The T-handle can be fastened to the yoke via a pivot pin or other arrangement that allows for movement of the T-handle relative to the yoke. The design of the yoke is non-limiting. In one non-limiting arrangement, the yoke includes a body and a cap. The body and cap can be both threaded and fastened together. The body generally includes a hole or cavity to house the gas system. The body can also include a connector (e.g., pinned attachment, etc.) to allow the yoke to be connected to the second ring half or second primary ring portion. The cap, when used, can be a female threaded component that contains a boss on the bottom to locate the spring system (e.g., gas spring). The cap can include a hex end, or other torque feature, to accommodate a socket wrench, or other tool, when being assembled; however, this is not required. The spring system, when a gas spring, is charged and located at least partially or fully within the yoke. The force that the spring system exerts can be variable and can be changed according to a particular application; however, this is not required. The latch assembly can be attached to the second ring half or second primary ring portion by a pin or other type of connection system. The threaded components of the yoke, when used, act upon the spring system and apply a pre-load force.

In another non-limiting aspect of the present invention, the hinge design is configured to connect the two ring halves or first and second primary ring portions and allows them to pivot relative to one another. The geometry of the hinge design allows the ring halves or first and second primary ring portions to open enough to overcome the outer diameter of the roll as it is being installed. The hinge design can be a single or double lap, or even spring loaded. The single lap design, when used, includes the joining of the two halves or first and second primary ring portions so that both flat surfaces are able to be parallel with each other. This can be accomplished by means such as a pin with a retaining ring or shoulder bolt. The double lap design, when used, includes male and female sections that are fastened by means such as a pin and also includes washers (e.g., polymer washers, etc.) with high temperature resistance. These washers are designed to keep the double lap design from binding due to deformed components. The spring loaded hinge, when used, includes a yoke that houses a hinge spring system (e.g., gas spring). The hinge spring system is designed to apply a force in contradiction of the opening motion of the lock ring, thus pushing the ring halves or first and second primary ring portions toward the closed position. Such a design can be used to aid in the installation of the lock ring onto a device.

The installation and operation of the lock ring of the present invention generally requires an operator and a solid length of material. In one non-limiting application, the lock ring is positioned near, or in, a roll groove where it will be located in service. The two ring halves or first and second primary ring portions are then closed by the operator so that the connection arrangement (e.g., T-handle) is in contact with the lead-in angle of the nest opening of the first ring half or first primary ring portion. A piece of material is then placed in an opening in the connection arrangement and force is applied to the connection arrangement in the direction toward the center of the roll. The force will be translated and the connection arrangement will enter the nest so that the lock ring is now closed and ready for service. When uninstalling the lock ring, a piece of material is inserted in an opening in the connection arrangement on top of the T-handle and force is applied that is opposite to the center of the roll. Such force will then be translated by the exit angle and the connection arrangement will lift out of the nest. Thereafter, the locking groove can then be removed from the groove in the roll.

The invention is novel in that the geometry and function of the lock ring makes its application easier and safer. The clamping force generated by the spring arrangement can be consistent at all times. When a gas spring is used, nitrogen gas is typically used as the medium within the spring. However, any compressible medium will have the same effect and work in the invention. Nitrogen is a compressible gas, and when compressed, yields a generally linear force to pressure curve that can be used to control the force over the stroke of the spring arrangement. As such, there is no variability due to operator intervention. The two ring halves or first and second primary ring portions can have a unique geometry that is void of catch points, thereby limiting any risk of interference with existing mill procedures such as moving the roll assemblies out of the mill during a roll change or lifting a roll off of another. They can be designed to have a double locking feature wherein the spring detents act as a safety feature so the connection arrangement (e.g., T-handle) will not come out of the nest in the event of the gas spring losing pressure. The iso-tension nature of the lock ring allows it to adapt to any variance in groove diameter due to wear or quality issues. This novel lock ring goes beyond the current apparatus in function thereby creating a safe, easy-to-use operator interface.

One non-limiting object of the present invention is the provision of an improved lock ring.

Another and/or alternative non-limiting object of the present invention is the provision of an improved lock ring that includes a spring biased locking mechanism.

Still another and/or alternative non-limiting object of the present invention is the provision of an improved lock ring that includes a spring biased locking mechanism and which is useful in retaining a choke assembly.

Yet another and/or alternative non-limiting object of the present invention is the provision of an improved lock ring that can have different shape/geometry characteristics so that the lock ring can be used as a substitute for existing prior art lock rings.

Still yet another and/or alternative non-limiting object of the present invention is the provision of an improved lock ring that significantly improves the safety and reliability of the locking feature of the lock ring.

Another and/or alternative non-limiting object of the present invention is the provision of an improved lock ring that is made of two ring halves or more than two ring portions.

Still another and/or alternative non-limiting object of the present invention is the provision of an improved lock ring wherein the first ring half or first primary ring portion includes a hook-like geometry that is acted upon to close and lock the lock ring, and the second ring half or second primary ring portion houses the latching assembly.

Yet another and/or alternative non-limiting object of the present invention is the provision of an improved lock ring wherein the first and second ring half or the portions of the lock ring are connected together to enable self-alignment with the lock ring is in the locked position.

Still yet another and/or alternative non-limiting object of the present invention is the provision of an improved lock ring includes a gap between the hinged region of the first and second ring half or the portions of the lock ring to enable self-alignment to obtain a snug fit with flat interfaces for mating components, thereby reducing or eliminating the need for adjustments.

Another and/or alternative non-limiting object of the present invention is the provision of an improved lock ring wherein the first and second ring halves or first and second primary ring portions can be smoothly rounded, contoured, etc. so that such rings or ring portions can be adapted to any envelope constraints so as to reduce or eliminate any feature of the lock ring that could cause interference with existing mates or methods/procedures in the mill or other application.

Still another and/or alternative non-limiting object of the present invention is the provision of an improved lock ring wherein the closing or locking function of the lock ring of the present invention is brought about by a latch assembly that includes a spring assembly that provides a clamping force.

Yet another and/or alternative non-limiting object of the present invention is the provision of an improved lock ring wherein the spring assembly can be formed of a one or more mechanical springs and/or fluid springs.

Still yet another and/or alternative non-limiting object of the present invention is the provision of an improved lock ring having a spring locking arrangement that is an isotension feature that allows the ring to flex to accommodate for any variance in roll groove diameter within the stroke of the spring.

Another and/or alternative non-limiting object of the present invention is the provision of an improved lock ring having a spring arrangement designed to provide a generally constant clamping force throughout its stroke.

Still another and/or alternative non-limiting object of the present invention is the provision of an improved lock ring wherein the ring halves or ring portions can be separated or brought together without losing this clamping force.

Yet another and/or alternative non-limiting object of the present invention is the provision of an improved lock ring wherein the clamping force of the spring arrangement can be variable to suit any need within sound engineering practices given the construction of the spring arrangement.

Still yet another and/or alternative non-limiting object of the present invention is the provision of an improved lock ring where the tension applied by the spring arrangement may or may not be a constant tension.

Another and/or alternative non-limiting object of the present invention is the provision of an improved lock ring wherein the ends of the lock ring that are connected together by the locking arrangement are typically designed to not make contact when the lock ring is in the locked position; however, this is not required.

Still another and/or alternative non-limiting object of the present invention is the provision of an improved lock ring wherein the lock ring is designed to provide an improved clamping force by the lock ring over the life of the installation regardless of wear on the groove and/or ring, and/or thermal growth of the roll or ring.

Yet another and/or alternative non-limiting object of the present invention is the provision of an improved lock ring wherein the tension applied by the lock ring is not dependent on torque, thereby increasing reliability of the lock ring.

Still another and/or alternative non-limiting object of the present invention is the provision of an improved lock ring wherein close tolerance manufacturing of the inside diameter of the lock ring is not necessary for a good fit as the spring arrangement on the lock ring can be designed to provide a relatively constant tension force across a wide range of sizes in the mating components.

Still yet another and/or alternative non-limiting object of the present invention is the provision of an improved lock ring wherein the first ring half or first primary ring portion includes a hook geometry or nest that is designed to receive the connection arrangement of the latching assembly.

Another and/or alternative non-limiting object of the present invention is the provision of an improved lock ring wherein the nest in the first ring half or first primary ring portion can include a lead-in angle to facilitate in the insertion of the connection arrangement into the nest.

Still another and/or alternative non-limiting object of the present invention is the provision of an improved lock ring wherein the nest in the first ring half or first primary ring portion can include an opening having an exit angle that is also designed to interact with the connection arrangement upon exiting the nest.

Yet another and/or alternative non-limiting object of the present invention is the provision of an improved lock ring including wherein the nest in the first ring half or first primary ring portion can include one or more safety detents designed to facilitate in retaining the connection arrangement in the nest.

Still yet another and/or alternative non-limiting object of the present invention is the provision of an improved lock ring wherein the nest in the first ring half or first primary ring portion can include spring biased safety detents.

Another and/or alternative non-limiting object of the present invention is the provision of an improved lock ring wherein the second ring half or second primary ring portion can include a hole or cavity that is used to house the latch assembly.

Still another and/or alternative non-limiting object of the present invention is the provision of an improved lock ring wherein the second ring half or second primary ring portion includes a latch assembly that creates the clamping force that keeps the lock ring in the closed or locked position.

Yet another and/or alternative non-limiting object of the present invention is the provision of an improved lock ring wherein the second ring half or second primary ring portion includes a latch that includes a connection arrangement, a yoke and a spring system or arrangement.

Still yet another and/or alternative non-limiting object of the present invention is the provision of an improved lock ring wherein the first and second ring halves or two or more ring portions are connected together by a hinge design that is configured to connect the two ring halves or ring portions together and allow them to pivot relative to one another.

Another and/or alternative non-limiting object of the present invention is the provision of an improved lock ring wherein the first and second ring halves or two or more ring portions are connected together by a hinge design that is configured to connect the two ring halves or ring portions together and allow them to pivot relative to one another and wherein the hinge design can be a single or double lap, or even spring loaded.

Still another and/or alternative non-limiting object of the present invention is the provision of an improved lock ring having a novel geometry and function that makes its application easier and safer.

These and other objects and advantages will become apparent from the following description and drawings.

BRIEF DESCRIPTION OF DRAWINGS

Reference may now be made to the drawings, which illustrate various embodiments that the invention may take in physical form and in certain parts and arrangements of parts wherein.

DETAILED DESCRIPTION OF NON-LIMITING EMBODIMENTS

Figure 1:
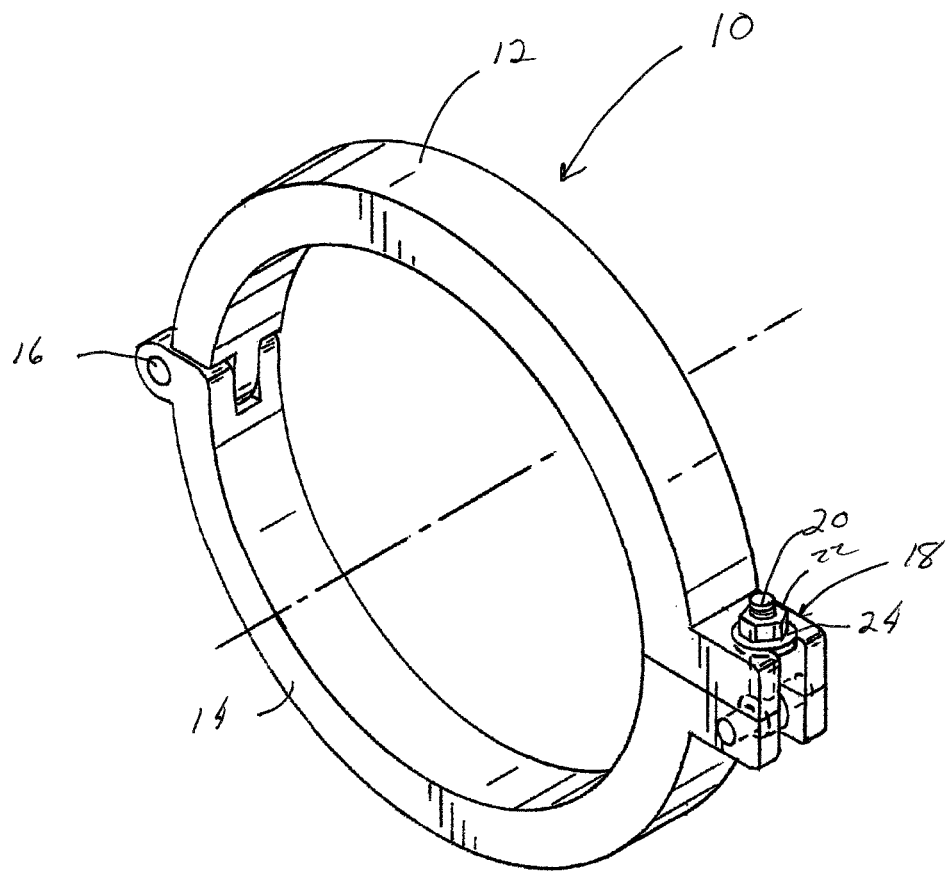
FIG. 1 is a perspective view of a prior art lock ring.

The present invention pertains to an improved lock ring over prior art lock rings. As illustrated in FIG. 1, a prior art lock ring 10 typically consists of two ring halves 12, 14 that are connected by a hinge 16 on one end and a latching mechanism 18 on the other end. The latching mechanism consists of a bolt 20 that is connected to one half 14 and pivots over to the other half 12 when in a closed position. A nut 22 and washer 24 are then tightened via hand and/or power tool to achieve the clamping force. This method of closure creates inconsistencies since the torque of the nut can be different from operator to operator. If the nut is not properly tightened, the lock ring may inadvertently open during use. The lock ring of the present invention overcomes these and others deficiencies of prior art lock rings.

The lock ring of the present invention is designed to provide an improved clamping force by the lock ring over the life of the installation regardless of wear on the groove and/or ring, and/or thermal growth of the roll or ring. Also, the tension applied by the lock ring is not dependent on torque, thereby increasing reliability of the lock ring. Also, close tolerance manufacturing of the inside diameter of the ring is not necessary for a good fit as the spring arrangement on the lock ring can be designed to provide a relatively constant tension force across a wide range of sizes in the mating components. As previously mentioned, prior art lock rings had several problems. One of the problems is that the lock ring becomes loose and thereby spins in the groove (relative to the roll). The lock ring of the present invention includes a spring tensioner that cannot spin because the tension can be constant or relatively constant from the spring. Also, the lock ring can be designed such that the ends of the ring have a gap between them when installed on the groove outer diameter. The use of a spring arrangement to create the locking force in a lock ring is believed to be novel to the art of lock rings.

Figure 2:
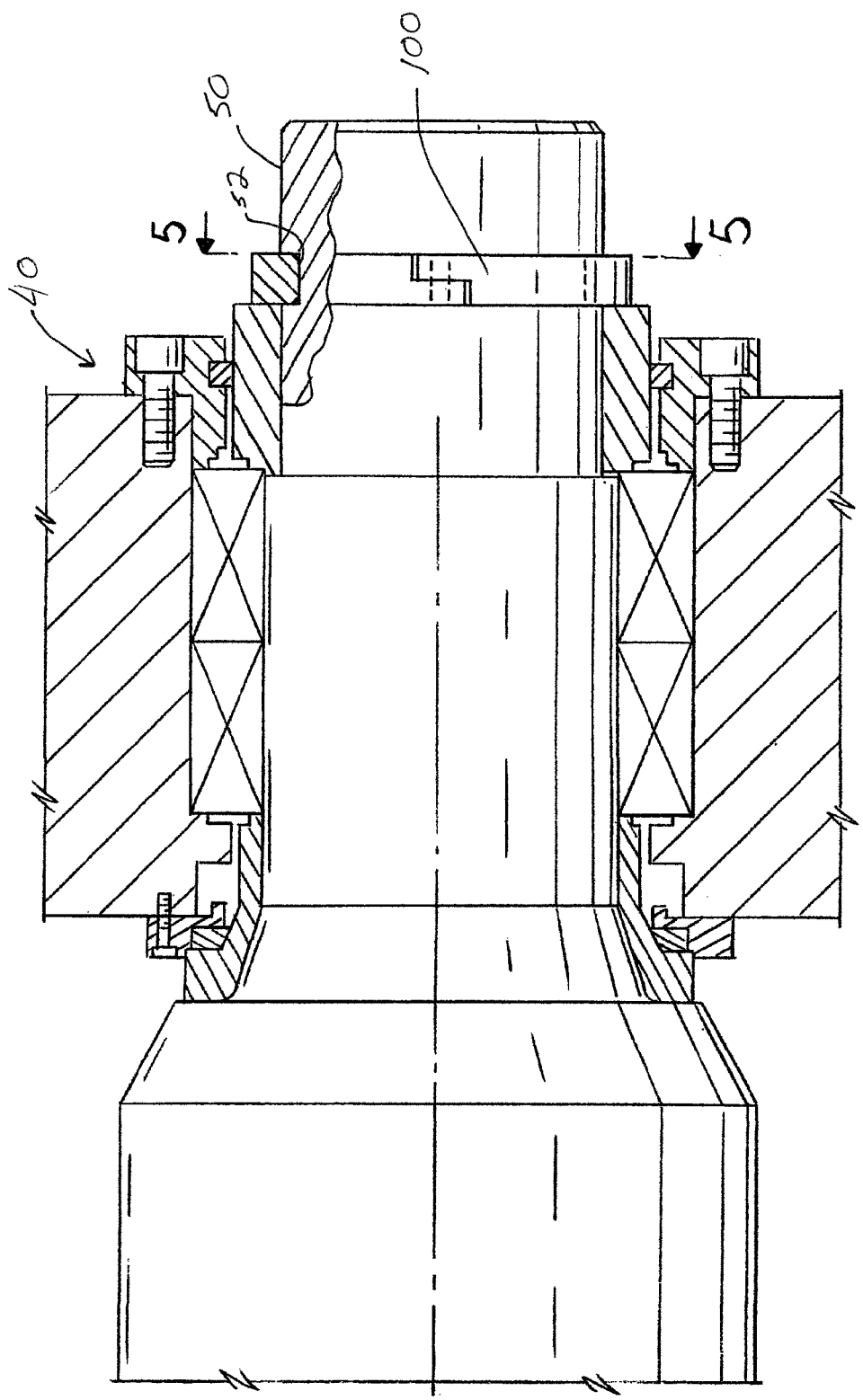
FIG. 2 is a side view of a lock ring of the present invention when fastened to the roll neck of a machined groove of a choke assembly.

Referring now to FIGS. 2-8, there is illustrated the lock ring 100 of the present invention. As illustrated in FIG. 2, the lock ring 100 is fastened to a machine such as a choke assembly 40 that is used to process metals. As can be appreciated, the lock ring of the present invention can be used in many other applications. As shown in FIG. 2, the lock ring is connected to the roll neck 50 in a machined groove 52. The lock ring is used to secure components on the choke assembly. The various components and operation of a choke assembly as known in the art and will not be further described herein.

Figure 3:
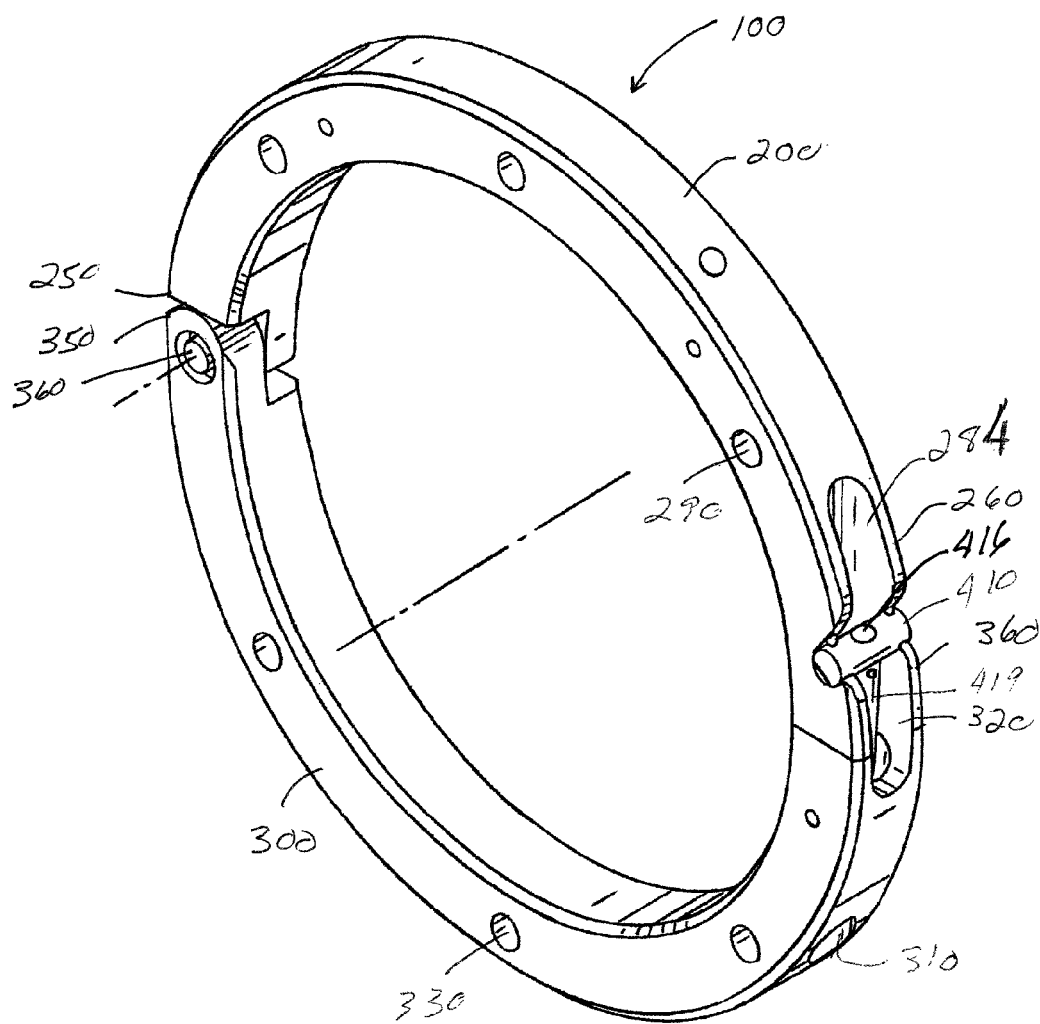
FIG. 3 is a perspective view of the lock ring of the present invention.

Referring now to FIG. 3, there is illustrated the lock ring 100 in the locked position. The lock ring is formed of two ring halves 200, 300. The first ring half 200 includes a hook-like geometry or nest 270 that is designed to be acted upon to close and enable the lock ring to be locked. The second ring half 300 typically houses the latching assembly 400.

Figure 8:
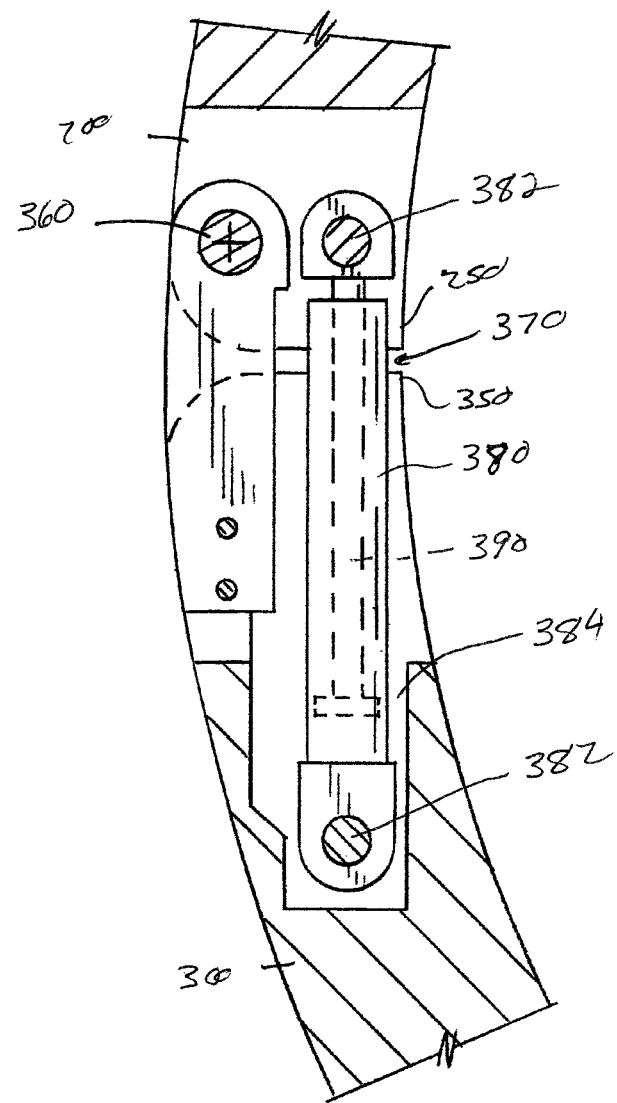
FIG. 8 is a cross-sectional side view of the hinged portion of the lock ring of the present invention.

The back end 250, 350 of the first and second ring halves are connected together via a hinge pin 360. As can be appreciated, other or alternative connection arrangements can be used. A gap 370 between the two back ends is generally present at the location of the hinge to allow for self-alignment of the first and second ring halves when the lock ring is positioned in the closed and locked position; however, this is not required. This self-aligning feature can be used to obtain a snug fit with flat interfaces for mating components, thereby reducing or eliminating the need for adjustments. The hinge is configured to connect the two ring halves and allow them to pivot relative to one another. The geometry of the hinge allows the ring halves to open enough to overcome the outer diameter of the roll or other component upon which the lock ring is to be installed. The hinge can be a single or double lap, or even spring loaded. The single lap design as illustrated in FIG. 3 (when used) includes the joining the two halves so that both flat surfaces are able to be parallel with each other. This can be accomplished by means such as a pin with a retaining ring or shoulder bolt. The double lap design (when used) includes male and female sections that are fastened by means such as a pin and also includes washers with high temperature resistance. These washers are designed to keep the double lap design from binding due to deformed components. The spring loaded hinge as illustrated in FIG. 8 (when used) includes a yoke 380 that houses a hinge spring system 390. The hinge spring system can be a mechanical and/or fluid spring system. The design, configuration and/or size of the hinge spring system is non-limiting. As illustrated in FIG. 8, the hinge spring system is a gas spring system. The yoke 380 is connected to the end portions of the back ends 250, 350 of the first and second ring halves by a pin 382 or other means. The pins can enable the end of the yoke to pivot relative to one or both of the back ends 250, 350 of the first and second ring halves; however, this is not required. The first and/or second ring halves can optionally include a hinge cavity 384 that is designed to partially contain a portion of the yoke. Such an arrangement forms a more compact configuration and eliminates the positioning of the hinge spring system on the side and/or outer surface of the first and/or second ring halves so as to reduce catch points on the lock ring. The hinge spring system is designed to apply a force in contradiction to the opening motion of the lock ring, thus pushing the first and second ring halves toward the closed position. Such a design can be used to aid in the installation of the lock ring onto a device.

Referring now to FIGS. 3-7, the first and second ring halves can optionally be smoothly rounded, contoured, etc. so that such ring halves can adapt to many different envelope constraints so as to reduce or eliminate any feature of the lock ring that could cause interference with existing mates or methods/procedures in the mill or other application.

The closing or locking function of the lock ring is brought about by a latch assembly 400 that includes a spring assembly that provides a clamping force. The spring assembly can be formed of a one or more mechanical springs and/or fluid springs. In one non-limiting arrangement, the spring assembly includes a gas spring. One non-limiting type of gas spring that can be used is a nitrogen gas spring. The use of a spring assembly to provide a clamping force when the lock ring is in the closed and locked position is an iso-tension feature that allows the lock ring to flex to accommodate for various variances in the roll groove diameter within the stroke of the spring assembly. The spring assembly is designed to provide a generally constant clamping force throughout its stroke. The ring halves can be separated or brought together without losing such clamping force. The clamping force can be variable to suit any need within sound engineering practices given the construction of the spring assembly used in the locking ring. The tension applied by the spring assembly may or may not be a constant tension. The ends of the first and second ring halves are typically designed to not make contact when the lock ring is in the closed and locked position and installed on the roll or other type of device; however, this is not required. The spring assembly is preloaded by tension to provide a clamping force on the roll groove or other type of device. The design, size and shape of the spring assembly are non-limiting. The size, shape, design and materials of the lock ring are also non-limiting.

Figure 5:
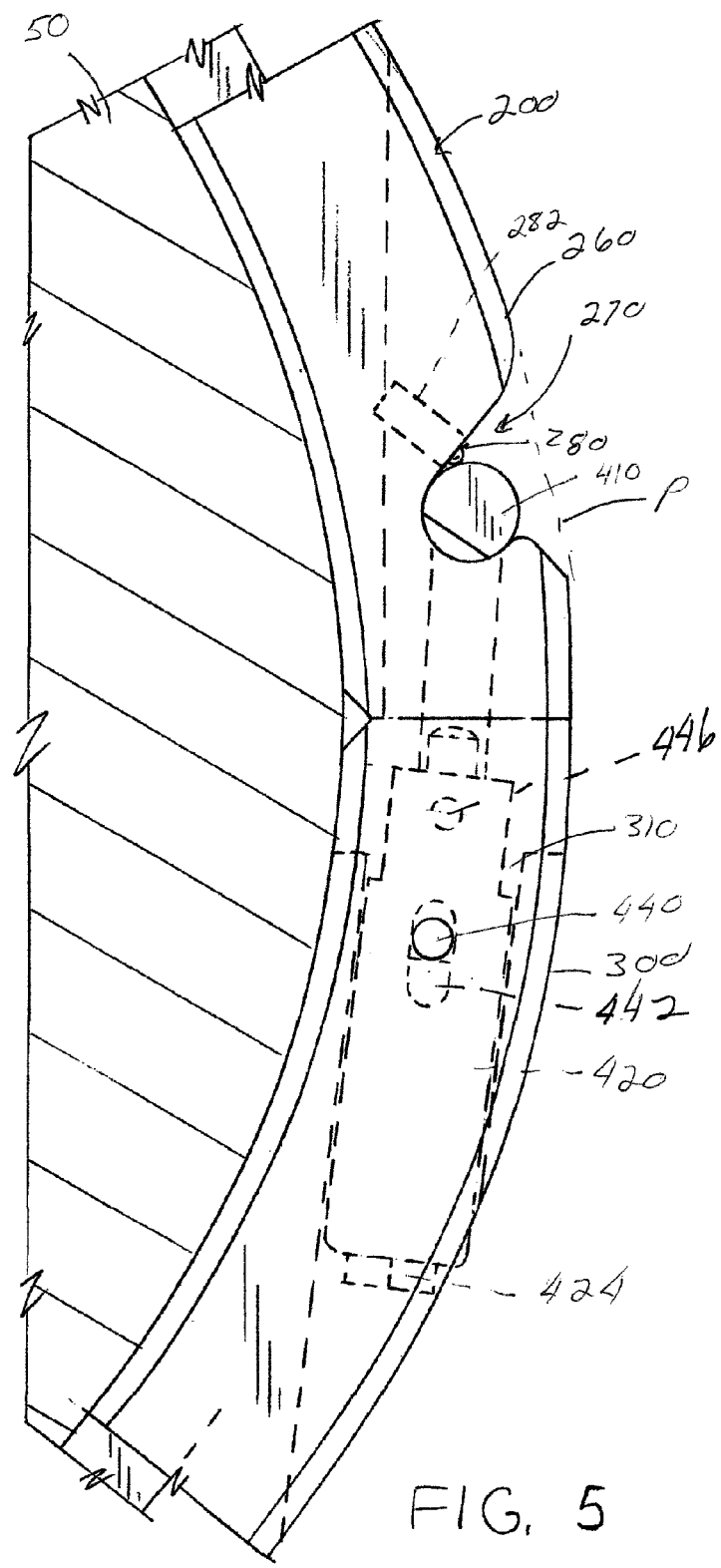
FIG. 5 is a cross-sectional view along line 5-5 of FIG. 2.
Figure 6:
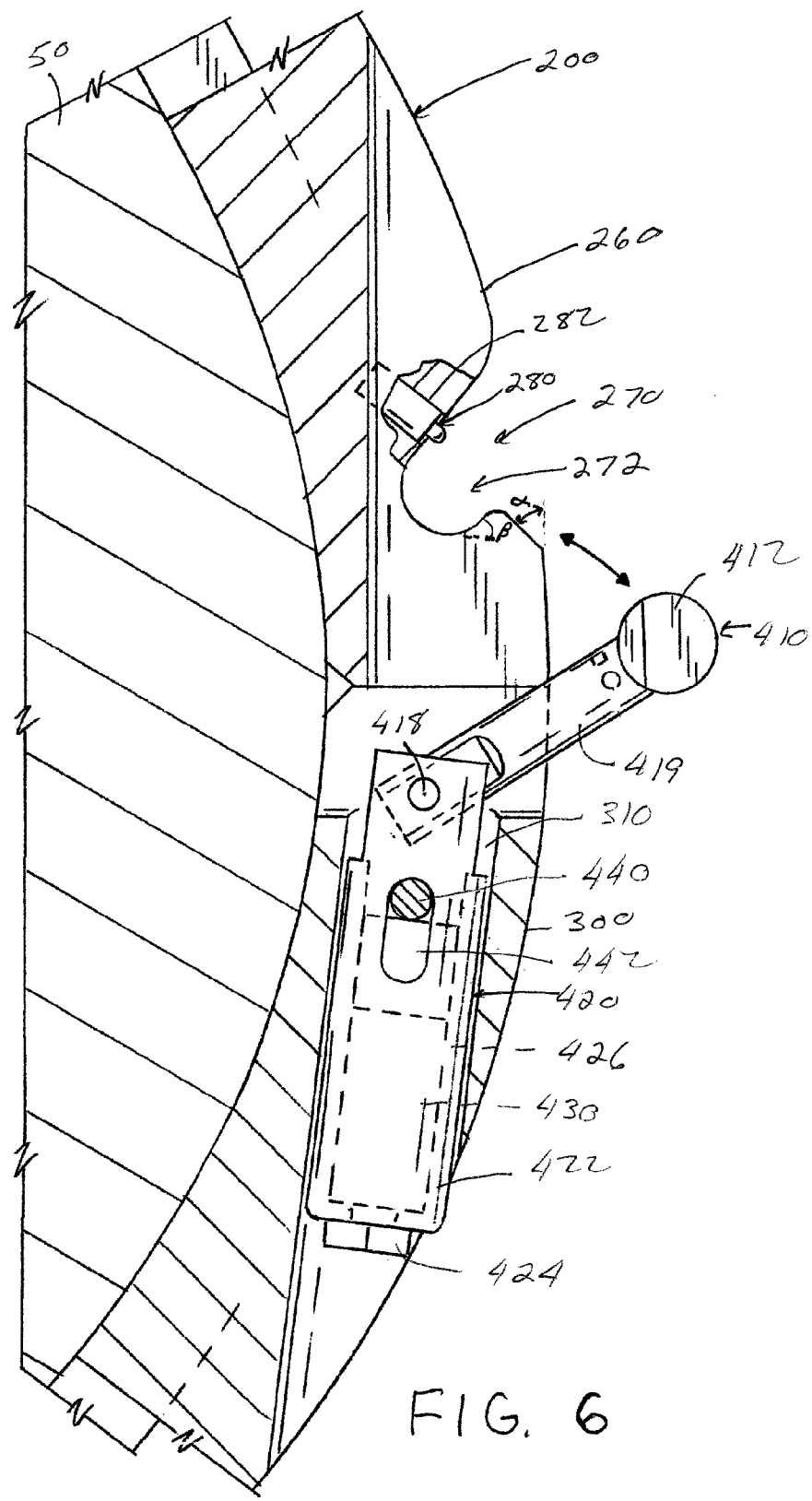
FIG. 6 is a side view of the lock ring in the closed, but unlocked position.
Figure 7:
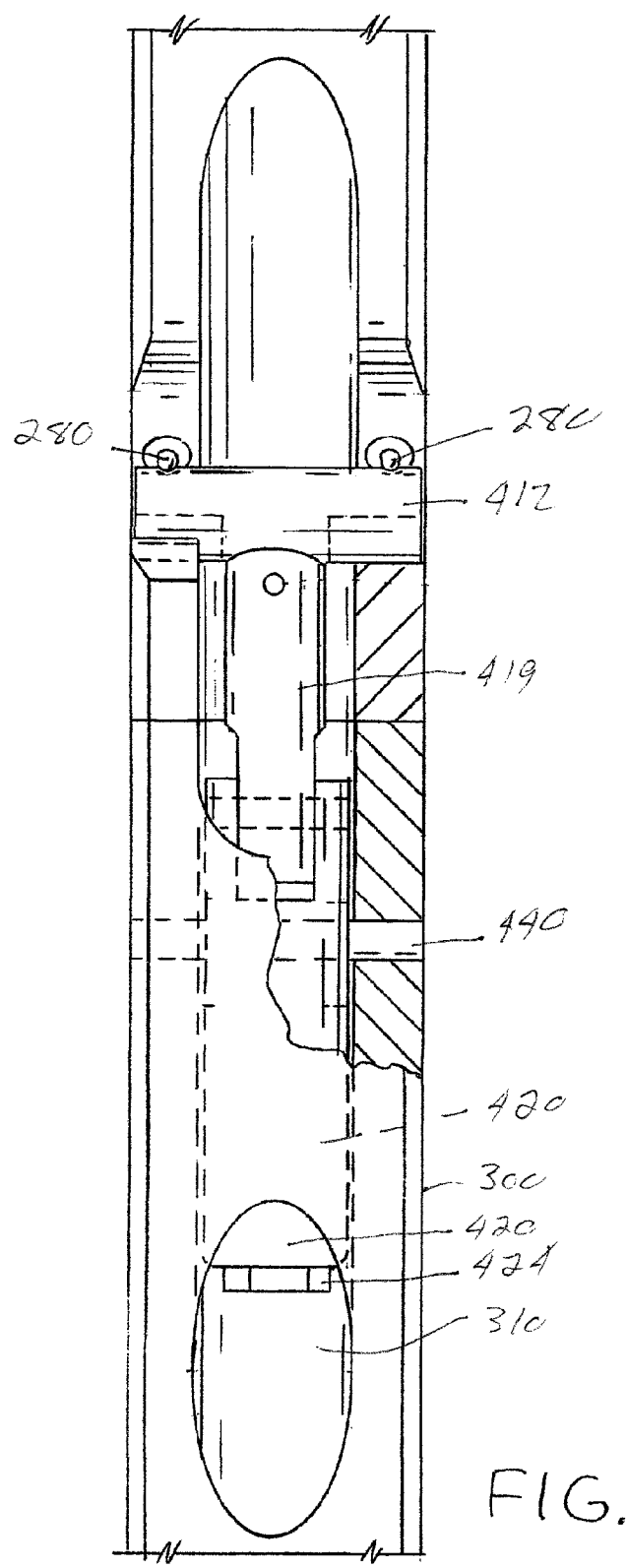
FIG. 7 is a sectional front view of the lock ring of FIG. 5.

Referring now to FIGS. 3 and 5-7, the front end 260 of the first ring half 200 includes a hook geometry or nest 270. The nest is the housing geometry for the T-handle of the latching assembly 400. The nest can be of any configuration. The nest includes a nest opening 272 that is designed to receive the T-handle. The size and shape of the nest opening is non-limiting. The nest opening can optionally include a lead-in angle $\alpha$ to facilitate in the insertion of the T-handle into the nest. The opening angle can be about 40-50°, and typically about 43°-48° from vertical and is designed to interact with the T-handle to facilitate in mechanically lifting the connection arrangement into the nest opening. The opening can optionally include an exit angle $\beta$ that is also designed to interact with the T-handle upon exiting the nest. The exit angle (when used) can be about 35-45°, and typically about 39-41° from horizontal to translate the forces imposed by the operator to mechanically lift the T-handle out of the nest. The lead-in and exit angle (when used) are typically designed to smoothly transition into one another with a radius. The size and depth of the nest hole is generally sized such that a majority of the cross feature of the T-handle fits into the nest opening. As illustrated in FIG. 5, the nest opening has a size that is at least about 60% of the cross-feature of the T-handle fits into the nest opening when the lock ring is in the closed and locked position. As also illustrated in FIG. 5, the cross feature of the T-handle when inserted into the nest opening is recessed from the outer perimeter P of the lock ring.

The nest can optionally include one or more safety detents 280. The safety detents are designed to facilitate in retaining the T-handle in the nest. The size and configuration of the one or more safety detents is non-limiting. The one or more safety detents are typically spring bias. The spring can be a mechanical and/or fluid spring. In one non-limiting configuration, the safety detents are spring loaded ball inserts. The spring loaded safety detents can be designed to exert a force of about 2-20 pounds, and typically about 4-11 pounds along its own axis of motion. The axis of motion is generally perpendicular to a surface tangent to the static home geometry and 2-20° (e.g., 7-12°) greater than the exit angle from horizontal; however, this is not required. The safety detents can be inserted into pre-drilled holes 282 in the first ring half. The safety detents act as a restraint to the T-handle to inhibit the T-handle from exiting the nest when the T-handle is positioned in the nest. This feature is best illustrated in FIG. 5. As such, in the event that the spring assembly in the second ring half loses strength or pressure, the one or more safety detents facilitate in keeping the T-handle in the nest.

The size of the nest is generally a diameter that is greater than an outside diameter of the T-horizontal component. Such diameter is generally about 0.063-0.078 inches greater than an outside diameter of the T-handle horizontal component.

The first ring half can optionally include slot 284 that can be used to facilitate in the removal or insertion of the T-handle into the nest opening. The first ring half can also optionally include one or more radial holes 290 that can be used to act as leverage slots or holes to rotate the second ring half relative to the roll neck; however, this is not required.

The second ring half 300 houses the latch assembly 400. Similar to the first ring half 200, the second ring half can be either smooth or contoured to adapt to any envelope constraints. The inner diameter or surface of the second ring half can optionally be chamfered to allow relief for radii in a roll groove.

The front end 360 of the second ring half 300 includes a latch cavity 310 that is used to house the latch assembly 400. The latch cavity is generally at an angle such that at least 10%, typically at least 30%, more typically at least a majority, and still more typically at least 60% of the latch assembly is contained within the latch cavity. The angle of the latch cavity is designed to also satisfy the constraint that, when in a closed position, the angle between the T-handle and the yoke is at an angle that does not exceed about 10-20° of the two being parallel, and typically about 15° of the two being parallel. The second ring half can optionally include slot 320 that can be used to facilitate in the removal or insertion of the T-handle into the nest opening. The second ring half can also optionally include one or more radial holes 330 that can be used to act as leverage slots or holes to rotate the second ring half relative to the roll neck; however, this is not required.

The latch assembly 400 is the mechanism that creates the clamping force that keeps the lock ring in the closed or locked position. The latch assembly includes a T-handle 410, a yoke 420 and a spring system 430. The T-handle 410 is a T-shaped piece of material (e.g., metal) that, in the closed position, sits in the static home geometry of the nest opening and transfers the force of the spring system to the first ring half. Both sides of the cross feature 412 of the T-handle can include an angled cut; however, this is not required. The angled cut surface 414 (when used) interacts with the lead-in angle of the nest opening to facilitate in inserting the T-handle into the nest opening when locking the lock ring and to facilitate in removing the T-handle from the nest when opening the lock ring. The bottom surface 417 of the T-handle can be generally flat; however, this is not required.

Figure 4:
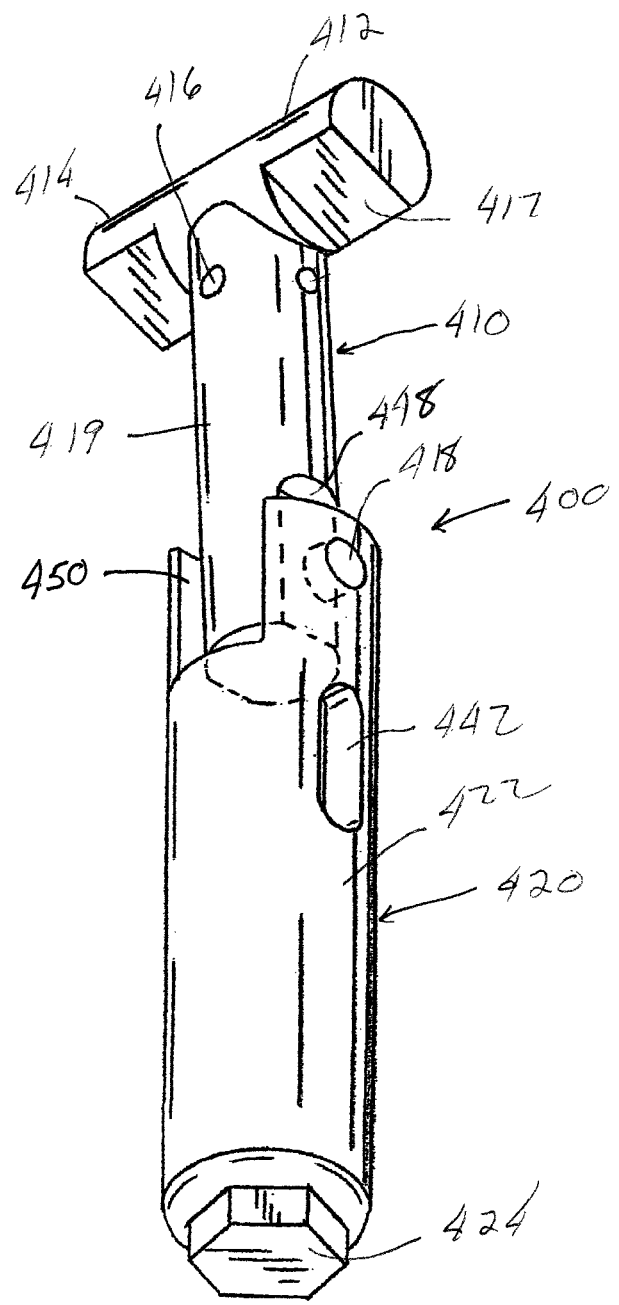
FIG. 4 is a perspective view of the latch assembly of the lock ring of the present invention.

A vertical hole 416 along the center axis of the vertical feature 419 and centered on the cross feature of the T-handle can optionally be used to facilitate in the locking and the unlocking of the lock ring. The vertical feature of T-handle can be fastened to the yoke via a pivot pin 418 or other arrangement that allows for movement of the T-handle relative to the yoke. The vertical feature can be generally cylindrical; however, this is not required. The length of the vertical feature is generally longer than the length of the cross feature; however, this is not required. The vertical feature is designed to move a certain distance along the longitudinal axis of the yoke so that the cross feature can be inserted into and removed from the nest opening. The bottom portion of the vertical feature is connected to the spring system and the spring system biases the vertical feature in the downward position. The bottom portion of the vertical feature can be connected to the spring system by a threaded arrangement, a pin or some other type of connection arrangement. The design of the yoke 420 is non-limiting. The yoke includes a body 422 and a cap 424. The body and cap can be both threaded and fastened together; however, other types of connection arrangements can be used. The yoke can optionally include a limit arrangement that is designed to limit the amount of movement of the vertical feature along the longitudinal axis of the yoke. As illustrated in FIG. 5, the body of the yoke includes a side slot 452 that enables pin 440 (e.g., pinned attachment, etc.) or type of structure to move within the slot. The length of the slot can be used to control the amount of movement of the vertical feature along the longitudinal axis of the yoke. Alternatively, pin 446 can be used to limit the amount of movement of the vertical feature along the longitudinal axis of the yoke. As illustrated in FIG. 4, the bottom portion of the vertical feature can include a indented region 448 that can be used to engage pin 416 thereby limiting the amount of movement of the vertical feature along the longitudinal axis of the yoke. As can be appreciated, other or additional arrangements can be used to limit the amount of movement of the vertical feature along the longitudinal axis of the yoke. The top of the yoke can include a slot arrangement 450 that allows the T-handle to pivot relative to the yoke. The size and configuration of the slot arrangement are non-limiting. The body generally includes a cavity 426 to house the spring system 430. Pin 440 can also or alternative be used to allow the yoke to be connected to the second ring half 300. As can be appreciated, other or alternative arrangements can be used to connect the yoke to the second ring half 300. The cap (when used) can be a female threaded component that contains a boss on the bottom to locate the spring system. The design, type and configuration of the spring system is non-limiting. When the spring system is in the form of a gas spring, the gas spring is charged while within the yoke; however, this is not required. The force that the spring system exerts can be variable and can be changed according to a particular application; however, this is not required.

The installation and operation of the lock ring 100 generally require an operator and a solid length of material. The lock ring is positioned in a roll groove where it will be located in service. The two ring halves are then closed by the operator so that the T-handle is in contact with the lead-in angle of the nest opening of the first ring half. If the lock ring includes a spring biased hinge, the spring biased hinge facilitates in the closing together of the two ring halves. A piece of material is then placed in an opening in the T-handle and force is applied to the T-handle in the direction toward the center of the roll. The force will be translated and the T-handle will enter the nest opening so that the lock ring is now in the closed and locked position as illustrated in FIG. 3 and is ready for service. When uninstalling the lock ring, a piece of material is inserted in an opening in the connection arrangement on top of the T-handle and a force is applied that is opposite to the center of the roll. Such a force will then be translated by the exit angle and the T-handle will lift out of the nest opening. Thereafter, the two ring halves can be separated from one another and the ring can be removed from the groove in the roll.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

What is claimed:

1. A lock ring comprising a first ring, a second ring and a latch assembly, said first ring including a nest having a nest opening on a front portion of said first ring, a back portion of said first ring portion hingedly connected to a back portion of said second ring, said latch assembly connected to a front portion of said second ring, said latch assembly including a connection arrangement and a spring arrangement, said connection arrangement configured to be releasably positionable and secured in said nest opening of said first ring when said lock ring is in a closed and locked position, said spring arrangement including a housing having a longitudinal axis and a vertical member that is movable along said longitudinal axis of said housing, said connection arrangement configured to move both in a plane that is non-parallel relative to the longitudinal axis of said housing and in a plane that is parallel to said longitudinal axis of said housing, said connection arrangement includes a base portion and a top portion, said base portion pivotally connected to said vertical member, said spring arrangement configured to cause said connection arrangement to move along said longitudinal axis of said housing when said vertical member moves along said longitudinal axis of said housing of said spring arrangement, said top portion of said connection arrangement configured to be at least partially positionable in said nest opening and to releasably connect to said nest of said first ring, said spring arrangement creating a force on said vertical member so as to cause said front portions of said first and second rings to be drawn toward one another when said connection arrangement is positioned in said nest opening, said front portion of each of said first and second rings has a front end, each of said first and second rings have an outer top surface, an inner bottom surface and a side surface positioned between said outer top surface and an inner bottom surface, said nest on said first ring at least partially positioned on said outer top surface of said first ring and spaced from said inner bottom surface of said first ring, said nest opening of said nest angling downwardly from said outer top surface of said first ring, said nest including a top slot and a bottom slot, said top slot at least partially positioned above said nest opening, said bottom slot at least partially positioned below said nest opening, said front portion of said second ring including a latch cavity, said latch cavity spaced from said inner bottom surface of said second ring, said latch cavity including a top opening and bottom opening, said front end of said second ring configured to contact said front end of said first ring when said first and second rings are in a locked position, said housing of said spring arrangement at least partially positioned in said latch cavity, at least a portion of said connection arrangement extending outwardly from said top opening of said latch cavity.

2. The lock ring as defined in claim 1, wherein said spring arrangement includes a gas spring, a mechanical spring, or combinations thereof to cause said vertical member to move along said longitudinal axis of said housing.

3. The lock ring as defined in claim 1, including a hinge spring connected to said back portions of said first and second rings, said hinge spring is configured to bias together said front end portions of said first and second rings.

4. A lock ring comprising a first ring, a second ring and a latch assembly, said first ring including a nest having a nest opening on a front portion of said first ring, a back portion of said first ring portion hingedly connected to a back portion of said second ring, said latch assembly connected to a front portion of said second ring, said latch assembly including a connection arrangement and a spring arrangement, said connection arrangement configured to be releasably positionable and secured in said nest opening of said first ring when said lock ring is in a closed and locked position, said spring arrangement including a housing having a longitudinal axis and a vertical member that is movable along said longitudinal axis of said housing, said connection arrangement configured to move both in a plane that is non-parallel relative to the longitudinal axis of said housing and in a plane that is parallel to said longitudinal axis of said housing, said connection arrangement includes a base portion and a top portion, said base portion pivotally connected to said vertical member, said spring arrangement configured to cause said connection arrangement to move along said longitudinal axis of said housing when said vertical member moves along said longitudinal axis of said housing of said spring arrangement, said top portion of said connection arrangement configured to be at least partially positionable in said nest opening and to releasably connect to said nest of said first ring, said spring arrangement creating a force on said vertical member so as to cause said front portions of said first and second rings to be drawn toward one another when said connection arrangement is positioned in said nest opening, said first ring includes a safety detent, said safety detent including an extension member that is moveable between and retracted and extended position, said extension member biased outwardly to said extended position by a detent spring arrangement, at least a portion of said extension member extends outwardly from an outer surface of said first ring portion when in said extended position, at least a portion of said extension member moveable into an interior of said first ring when in said retracted position, said extension member configured to facilitate in maintaining said top portion of said connection arrangement of said latch assembly in said nest opening when said lock ring is in a locked position.

5. The lock ring as defined in claim 4, wherein said detent spring arrangement of said safety detent outwardly biases said extension member by at least 1 pounds of force.

6. A lock ring comprising a first ring, a second ring and a latch assembly, said first ring including a nest having a nest opening on a front portion of said first ring, a back portion of said first ring portion hingedly connected to a back portion of said second ring, said latch assembly connected to a front portion of said second ring, said latch assembly including a connection arrangement and a spring arrangement, said connection arrangement configured to be releasably positionable and secured in said nest opening of said first ring when said lock ring is in a closed and locked position, said spring arrangement including a housing having a longitudinal axis and a vertical member that is movable along said longitudinal axis of said housing, said connection arrangement configured to move both in a plane that is non-parallel relative to the longitudinal axis of said housing and in a plane that is parallel to said longitudinal axis of said housing, said connection arrangement includes a base portion and a top portion, said base portion pivotally connected to said vertical member, said spring arrangement configured to cause said connection arrangement to move along said longitudinal axis of said housing when said vertical member moves along said longitudinal axis of said housing of said spring arrangement, said top portion of said connection arrangement configured to be at least partially positionable in said nest opening and to releasably connect to said nest of said first ring, said spring arrangement creating a force on said vertical member so as to cause said front portions of said first and second rings to be drawn toward one another when said connection arrangement is positioned in said nest opening, said a base portion and said top portion of said connection arrangement forms a T-shape configuration, said top portion including an arcuate top surface that is configured to engage corresponding arcuate surfaces in said nest when said top portion is releasably connected to said nest.

7. The lock ring as defined in claim 1, wherein said nest opening includes a lead-in angle of about 20-70° from vertical.

8. The lock ring as defined in claim 1, wherein said nest opening includes an exit angle of about 20-70° from horizontal.

9. A method for using a lock ring comprising the steps of:
a. providing a lock ring, said lock ring comprising a first ring, a second ring and a latch assembly, said first ring including a nest having a nest opening on a front portion of said first ring, a back portion of said first ring portion hingedly connected to a back portion of said second ring, said latch assembly connected to a front portion of said second ring, said latch assembly including a connection arrangement and a spring arrangement, said connection arrangement configured to be releasably positionable and secured in said nest opening of said first ring when said lock ring is in a closed and locked position, said spring arrangement including a housing having a longitudinal axis and a vertical member that is movable along said longitudinal axis of said housing, said connection arrangement configured to move both in a plane that is non-parallel relative to the longitudinal axis of said housing and in a plane that is parallel to said longitudinal axis of said housing, said connection arrangement includes abase portion and a top portion, said base portion pivotally connected to said vertical member, said spring arrangement configured to cause said connection arrangement to move along said longitudinal axis of said housing when said vertical member moves along said longitudinal axis of said housing of said spring arrangement, said top portion of said connection arrangement configured to be at least partially positionable in said nest opening and to releasably connect to said nest of said first ring, said spring arrangement creating a force on said vertical member so as to cause said front portions of said first and second rings to be drawn toward one another when said connection arrangement is positioned in said nest opening, said base portion and said top portion of said connection arrangement forms a T-shape configuration, said top portion including an arcuate top surface that is configured to engage corresponding arcuate surfaces in said nest when said top portion is releasably connected to said nest;

b. positioning said first and second rings about a member; and, c. inserting said connection arrangement into said nest opening to secure said lock ring in a closed and locked position.

10. The method as defined in claim 9, wherein said spring arrangement includes a gas spring, a mechanical spring, or combinations thereof to cause said vertical member to move along said longitudinal axis of said housing.

11. The method as defined in claim 9, including a hinge spring connected to said back portions of said first and second rings, said hinge spring is configured to bias together said front end portions of said first and second rings.

12. A method for using a lock ring comprising the steps of:

a. providing a lock ring, said lock ring comprising a first ring, a second ring and a latch assembly, said first ring including a nest having a nest opening on a front portion of said first ring, a back portion of said first ring portion hingedly connected to a back portion of said second ring, said latch assembly connected to a front portion of said second ring, said latch assembly including a connection arrangement and a spring arrangement, said connection arrangement configured to be releasably positionable and secured in said nest opening of said first ring when said lock ring is in a closed and locked position, said spring arrangement including a housing having a longitudinal axis and a vertical member that is movable along said longitudinal axis of said housing, said connection arrangement configured to move both in a lane that is non-parallel relative to the longitudinal axis of said housing and in a plane that is parallel to said longitudinal axis of said housing, said connection arrangement includes a base portion and a top portion, said base portion pivotally connected to said vertical member, said spring arrangement configured to cause said connection arrangement to move along said longitudinal axis of said housing when said vertical member moves along said longitudinal axis of said housing of said spring arrangement, said top portion of said connection arrangement configured to be at least partially positionable in said nest opening and to releasably connect to said nest of said first ring, said spring arrangement creating a force on said vertical member so as to cause said front portions of said first and second rings to be drawn toward one another when said connection arrangement is positioned in said nest opening, said first ring includes a safety detent, said safety detent including an extension member that is moveable between and retracted and extended position, said extension member biased outwardly to said extended position by a detent spring arrangement, at least a portion of said extension member extends outwardly from an outer surface of said first ring portion when in said extended position, at least a portion of said extension member moveable into an interior of said first ring when in said retracted position, said extension member configured to facilitate in maintaining a portion of said connection arrangement of said latch assembly in said nest opening when said lock ring is in a locked position;

b. positioning said first and second rings about a member; and, c. inserting said connection arrangement into said nest opening to secure said lock ring in a closed and locked position.

13. A lock ring for use in retaining a chock assembly that is used in the processing of metals, said lock ring comprising a first ring, a second ring and a latch assembly configured to releasably connect said first and second rings, each of said first and second rings having a front portion with a front end, a rear portion, an outer top surface, an inner bottom surface and a side surface positioned between said outer top surface and an inner bottom surface, said front portion of said first ring including a nest, said nest at least partially positioned on said outer top surface of said first ring and spaced from said inner bottom surface of said first ring, said nest including a nest opening that angles downwardly from said outer top surface of said first ring, said nest including a top slot and a bottom slot, said top slot at least partially positioned above said nest opening, said bottom slot at least partially positioned below said nest opening, said front portion of said second ring including a latch cavity, said latch cavity spaced from said inner bottom surface of said second ring, said latch cavity including a top opening and bottom opening, said front end of said second ring configured to contact said front end of said first ring when said first and second rings are in a locked position, said latch assembly including a spring arrangement and a latch arrangement, said spring arrangement at least partially positioned in said latch cavity, said spring arrangement including a housing having a longitudinal axis and a vertical member that is movable along said longitudinal axis of said housing, at least a portion of said latch arrangement extending outwardly from said top opening of said latch cavity, said latch arrangement configured to move in both a plane that is non-parallel relative to the longitudinal axis of said housing of said spring arrangement and in a plane that is parallel to said longitudinal axis of said housing, said latch arrangement includes a base portion and a top portion, said base portion pivotally connected to said vertical member, said spring arrangement configured to cause said connection arrangement to move along said longitudinal axis of said housing when said vertical member moves along said longitudinal axis of said housing of said spring arrangement, said top portion of said latch arrangement configured to be at least partially positionable in said nest opening and to releasably connect to said nest of said first ring, said spring arrangement configured to create a force on said vertical member so as to cause said front portions of said first and second rings so as to be drawn toward one another when said top portion of said latch arrangement is positioned in said nest, said spring arrangement including one or more mechanical springs, fluid springs or combinations thereof.

14. The lock ring as defined in claim 13, wherein said rear portion of said first and second rings are movably connected together.

15. The lock ring as defined in claim 13, wherein said nest of said first ring includes a safety detent, said safety detent including an extension member that is moveable between retracted and extended positions, said extension member biased outwardly to said extended position by a detent spring arrangement, at least a portion of said extension member extends outwardly from an outer surface of said first ring portion when in said extended position, at least a portion of said extension member moveable into an interior of said first ring when in said retracted position, configured to engage said top surface region of said top portion of said latch arrangement when said top portion is releasably connected to said nest to thereby inhibit said top portion from inadvertently disconnecting from said nest.

16. The lock ring as defined in claim 14, wherein said nest of said first ring includes a safety detent, said safety detent including an extension member that is moveable between retracted and extended positions, said extension member biased outwardly to said extended position by a detent spring arrangement, at least a portion of said extension member extends outwardly from an outer surface of said first ring portion when in said extended position, at least a portion of said extension member moveable into an interior of said first ring when in said retracted position, configured to engage said top surface region of said top portion of said latch arrangement when said top portion is releasably connected to said nest to thereby inhibit said top portion from inadvertently disconnecting from said nest.

17. The lock ring as defined in claim 16, wherein said nest includes a plurality of said safety detents.

18. The lock ring as defined in claim 13, including a hinge spring connected to said back end portions of said first and second rings, said hinge spring biasing together said front portions of said first and second rings.

19. The lock ring as defined in claim 17, including a hinge spring connected to said back end portions of said first and second rings, said hinge spring biasing together said front portions of said first and second rings.

20. The lock ring as defined in claim 13, wherein said base portion and said top portion of said latch arrangement form a T-shape configuration, said top portion including an arcuate top surface that is configured to engage corresponding arcuate surfaces in said nest when said top portion is releasably connected to said nest.

21. The lock ring as defined in claim 19, wherein said base portion and said top portion of said latch arrangement form a T-shape configuration, said top portion including an arcuate top surface that is configured to engage corresponding arcuate surfaces in said nest when said top portion is releasably connected to said nest.

22. The locking ring as defined in claim 13, wherein a longitudinal axis of said base portion of said latch arrangement is angled at least 10° from a longitudinal axis of said vertical member of said spring arrangement when said top portion of said handle arrangement is releasably connected to said nest.

23. The locking ring as defined in claim 21, wherein a longitudinal axis of said base portion of said latch arrangement is angled at least 10° from a longitudinal axis of said vertical member of said spring arrangement when said top portion of said handle arrangement is releasably connected to said nest.

24. The lock ring as defined in claim 13, wherein each of said first and second rings includes a plurality of radial holes that pass fully through the side surface of said first and second rings.

25. The lock ring as defined in claim 13, wherein said nest opening includes a lead-in angle of about 20-70° from vertical, and said nest opening includes an exit angle of about 20-70° from horizontal.

26. The lock ring as defined in claim 13, wherein said spring arrangement includes a limit arrangement that limits vertical movement of said vertical member relative to said body of said spring arrangement.

27. The lock ring as defined in claim 13, wherein said spring arrangement includes a fluid spring to cause said vertical member to move along said longitudinal axis of said housing.

28. A method for using a lock ring comprising the steps of:
a. providing a lock ring, said lock ring comprising a first ring, a second ring and a latch assembly configured to releasably connect said first and second rings, each of said first and second rings having a front portion with a front end, a rear portion, an outer top surface, an inner bottom surface and a side surface positioned between said outer top surface and an inner bottom surface, said front portion of said first ring including a nest, said nest at least partially positioned on said outer top surface of said first ring and spaced from said inner bottom surface of said first ring, said nest including a nest opening that angles downwardly from said outer top surface of said first ring, said nest including a top slot and a bottom slot, said top slot at least partially positioned above said nest opening, said bottom slot at least partially positioned below said nest opening, said front portion of said second ring including a latch cavity, said latch cavity spaced from said inner bottom surface of said second ring, said latch cavity including a top opening and bottom opening, said front end of said second ring configured to contact said front end of said first ring when said first and second rings are in a locked position, said latch assembly including a spring arrangement and a latch arrangement, said spring arrangement at least partially positioned in said latch cavity, said spring arrangement including a housing having a longitudinal axis and a vertical member that is movable along said longitudinal axis of said housing, at least a portion of said latch arrangement extending outwardly from said top opening of said latch cavity, said latch arrangement configured to move in a plane that is non-parallel relative to the longitudinal axis of said housing of said spring arrangement, said latch arrangement includes a base portion and a top portion, said base portion pivotally connected to said vertical member, said spring arrangement configured to cause said connection arrangement to move along said longitudinal axis of said housing when said vertical member moves along said longitudinal axis of said housing of said spring arrangement, said top portion of said latch arrangement configured to be at least partially positionable in said nest opening and to releasably connect to said nest of said first ring, said spring arrangement configured to create a force on said vertical member so as to cause said front portions of said first and second rings so as to be drawn toward one another when said top portion of said latch arrangement is positioned in said nest, said spring arrangement including one or more mechanical springs, fluid springs or combinations thereof to cause said vertical member to move along said longitudinal axis of said housing;
b. positioning said first and second rings about a chock assembly that is used in the processing of metals; and,
c. inserting said top portion of said latch arrangement into said nest opening to secure said lock ring in a closed and locked position.

29. The method as defined in claim 28, wherein said rear portion of said first and second rings are movably connected together.

30. The method as defined in claim 28, wherein said nest of said first ring includes a safety detent, said safety detent including an extension member that is moveable between retracted and extended positions, said extension member biased outwardly to said extended position by a detent spring arrangement, at least a portion of said extension member extends outwardly from an outer surface of said first ring portion when in said extended position, at least a portion of said extension member moveable into an interior of said first ring when in said retracted position, configured to engage said top surface region of said top portion of said latch arrangement when said top portion is releasably connected to said nest to thereby inhibit said top portion from inadvertently disconnecting from said nest.

31. The method as defined in claim 28, including a hinge spring connected to said back end portions of said first and second rings, said hinge spring biasing together said front portions of said first and second rings.

32. The method as defined in claim 28, wherein said base portion and said top portion of said latch arrangement form a T-shape configuration, said top portion including an arcuate top surface that is configured to engage corresponding arcuate surfaces in said nest when said top portion is releasably connected to said nest, a longitudinal axis of said base portion of said latch arrangement is angled at least 10° from a longitudinal axis of said vertical member of said spring arrangement when said top portion of said handle arrangement is releasably connected to said nest.

33. The method as defined in claim 28, wherein said nest opening includes a lead-in angle of about 20-70° from vertical, and said nest opening includes an exit angle of about 20-70° from horizontal.

34. The method as defined in claim 28, wherein said spring arrangement includes a limit arrangement that limits vertical movement of said vertical member relative to said body of said spring arrangement.

35. The lock ring as defined in claim 23, wherein said spring arrangement includes a fluid spring to cause said vertical member to move along said longitudinal axis of said housing.

36. The lock ring as defined in claim 35, wherein said spring arrangement includes a limit arrangement that limits vertical movement of said vertical member relative to said body of said spring arrangement.

37. The method as defined in claim 29, wherein said nest of said first ring includes a safety detent, said safety detent including an extension member that is moveable between retracted and extended positions, said extension member biased outwardly to said extended position by a detent spring arrangement, at least a portion of said extension member extends outwardly from an outer surface of said first ring portion when in said extended position, at least a portion of said extension member moveable into an interior of said first ring when in said retracted position, configured to engage said top surface region of said top portion of said latch arrangement when said top portion is releasably connected to said nest to thereby inhibit said top portion from inadvertently disconnecting from said nest.

38. The method as defined in claim 37, wherein said base portion and said top portion of said latch arrangement form a T-shape configuration, said top portion including an arcuate top surface that is configured to engage corresponding arcuate surfaces in said nest when said top portion is releasably connected to said nest, a longitudinal axis of said base portion of said latch arrangement is angled at least 10° from a longitudinal axis of said vertical member of said spring arrangement when said top portion of said handle arrangement is releasably connected to said nest.

39. The method as defined in claim 38, wherein said spring arrangement includes a limit arrangement that limits vertical movement of said vertical member relative to said body of said spring arrangement.

40. The method as defined in claim 39, wherein said nest opening includes a lead-in angle of about 20-70° from vertical, and said nest opening includes an exit angle of about 20-70° from horizontal.

41. The method as defined in claim 40, including a hinge spring connected to said back end portions of said first and second rings, said hinge spring biasing together said front portions of said first and second rings.

* * * * *